United States Patent
Frick et al.

(10) Patent No.: US 9,767,512 B2
(45) Date of Patent: Sep. 19, 2017

(54) METHOD AND APPARATUS FOR LOGICALLY DETERMINING WHETHER RECEIVED QUERIES QUALIFY FOR STRAIGHT-THROUGH-PROCESSING

(71) Applicant: Bank of America Corporation, Charlotte, NC (US)

(72) Inventors: Terri L. Frick, Charlotte, NC (US); Gerardo R. Garcia, Charlotte, NC (US); Maia H. Hardin, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 78 days.

(21) Appl. No.: 14/588,435

(22) Filed: Jan. 1, 2015

(65) Prior Publication Data
US 2016/0196444 A1    Jul. 7, 2016

(51) Int. Cl.
*G06Q 40/00* (2012.01)
*G06F 21/62* (2013.01)

(52) U.S. Cl.
CPC ......... *G06Q 40/00* (2013.01); *G06F 21/6218* (2013.01)

(58) Field of Classification Search
CPC ..... G06F 2221/2113; G06F 2221/2141; G06F 2221/2145; G06F 21/6245; G06Q 40/00
See application file for complete search history.

(56) References Cited

U.S. PATENT DOCUMENTS

| 8,468,090 B2 | 6/2013 | Lesandro et al. | |
|---|---|---|---|
| 2002/0029337 A1* | 3/2002 | Sudia | G06Q 20/401 713/176 |
| 2003/0078880 A1* | 4/2003 | Alley | G06F 21/645 705/38 |
| 2007/0016514 A1* | 1/2007 | Al-Abdulqader | G06Q 10/06 705/37 |
| 2007/0079139 A1* | 4/2007 | Kim | G06F 21/64 713/186 |
| 2008/0281735 A1* | 11/2008 | Allin | G06Q 10/06 705/34 |
| 2010/0138326 A1 | 6/2010 | Joao | |

(Continued)

*Primary Examiner* — Harunur Rashid
*Assistant Examiner* — Wayne An
(74) *Attorney, Agent, or Firm* — Weiss & Arons LLP; Michael A. Springs, Esq.

(57) ABSTRACT

An apparatus for validating entitlement capabilities, and determining, based on the entitlement capabilities, whether an account request associated with the entitlement capabilities qualifies for Straight Through Processing is provided. The apparatus may include a receiver. The receiver may receive entitlement authorization for a signatory and a client request to open an account. The apparatus may also include memory configured to: store, in a centralized repository, entitlement capabilities for the authorized signatory. The centralized repository may provide access to one or more signature documents associated with the authorized signatory. The centralized repository may link the signatory to one or more signature documents associated with the signatory's authorization. The apparatus may also include a display configured to display a hierarchal map of the one or more authorized signatories. The hierarchal map illustrates lines of authority from the authorized signatories to each of their respective authorizers.

14 Claims, 5 Drawing Sheets

(56) References Cited

U.S. PATENT DOCUMENTS

| | | |
|---|---|---|
| 2010/0274723 A1 | 10/2010 | Joao |
| 2012/0054095 A1* | 3/2012 | Lesandro ............... G06Q 20/10 705/39 |
| 2012/0179494 A1 | 7/2012 | He et al. |
| 2014/0149283 A1* | 5/2014 | Roselli .................. G06Q 20/10 705/39 |
| 2015/0213404 A1* | 7/2015 | Follis .................... G06Q 10/10 705/317 |

* cited by examiner

METHOD AND APPARATUS FOR LOGICALLY DETERMINING WHETHER RECEIVED QUERIES QUALIFY FOR STRAIGHT-THROUGH-PROCESSING

FIELD OF TECHNOLOGY

This application relates to database storage. Specifically, this application relates to databases for storing information relating to entitlement capabilities and authorized signatories associated therewith.

BACKGROUND OF THE DISCLOSURE

Repositories for storing information relating to individuals' entitlement capabilities within an entity—for example, information regarding who possesses signatory authority for an account, an entity, or for a financial institution, and to what areas the individual's signatory authority extends—are typically not maintained in electronic form. Rather, such information and associated documentation is usually stored in hard copies.

It would be desirable to store such information electronically.

It would be further desirable to display such stored information in a way that enables efficient modification, inspection and/or manipulation of such information, when necessary.

SUMMARY OF THE INVENTION

A method for validating entitlement capabilities is provided. The method may include receiving entitlement authorization for a signatory. The method may also include storing, in a centralized repository, entitlement capabilities for the authorized signatory. The centralized repository may provide access to one or more signature documents associated with the authorized signatory. The method may further include linking the signatory to one or more signature documents associated with the signatory's authorization. In addition, the method may include displaying, on a display, a hierarchal map of the one or more authorized signatories. The hierarchal map may illustrate lines of authority. The lines of authority may extend from the one or more authorized signatories to each of their respective authorizers. The lines of authority may preferably include a vertical component. The method may also include receiving a client request to open an account, edit information, and/or maintain an account in any suitable fashion. Based on the information stored in the repository, the method may further process the client request with Straight Through Processing.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
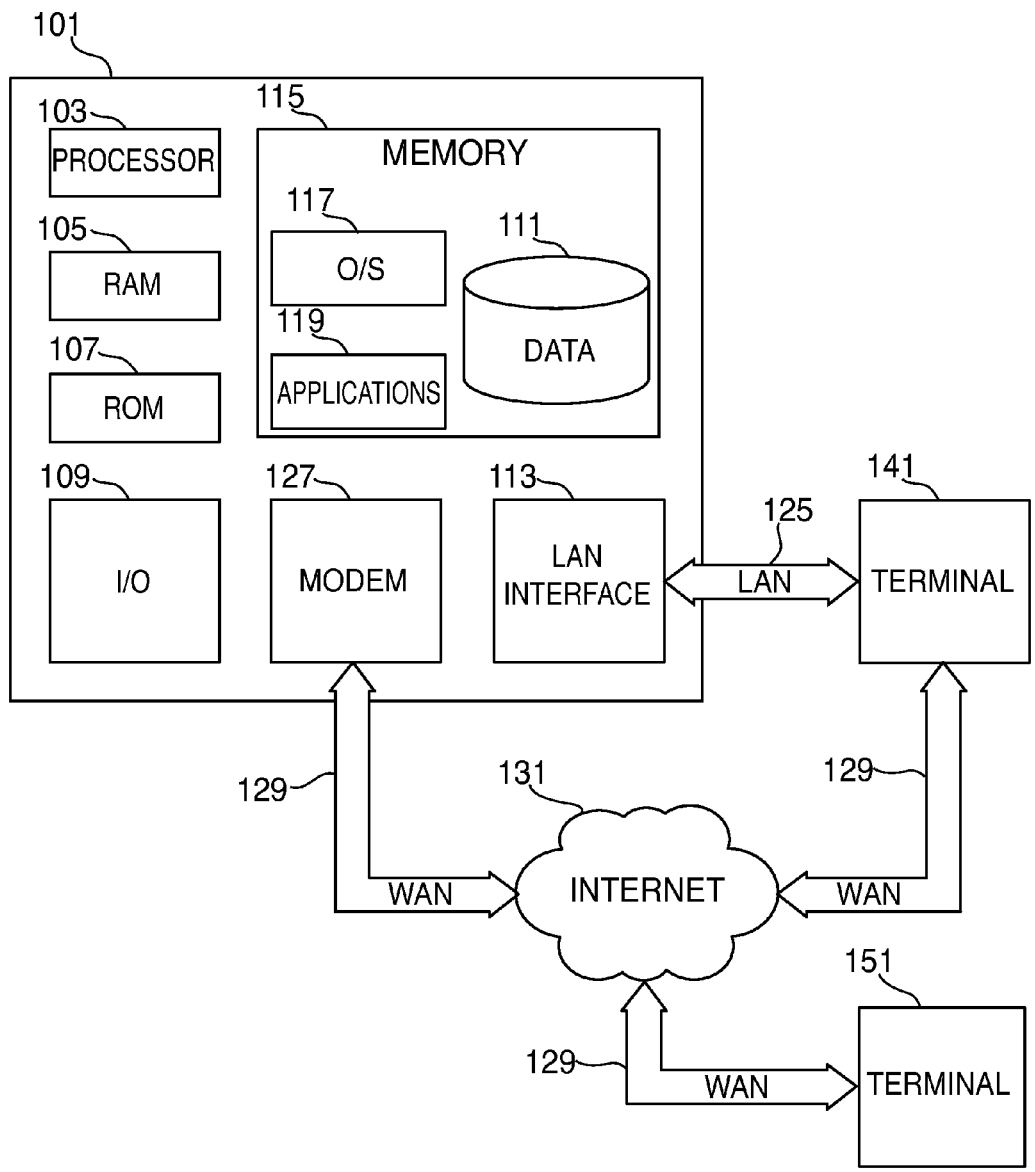
FIG. 1 shows an illustrative apparatus in accordance with principles of the invention.

Apparatus, methods and media (collectively referred to herein as a "system") for validating entitlement capabilities for authorized signatories are provided.

For the sake of illustration, the invention will be described as being performed by a "system." The "system" may include one or more of the features of the apparatus and methods that are shown or described herein and/or any other suitable device or approach. The "system" may be provided by an entity. The entity may be an individual, an organization or any other suitable entity.

The system may include a repository. The repository may be a centralized repository. The centralized repository may provide one or more capabilities.

The system may receive an authorization. The authorization may be an entitlement authorization. The entitlement authorization may be entitlement for a signatory.

The system may store entitlement capabilities. The entitlement capabilities may be stored in the centralized repository. The entitlement capabilities may be entitlement capabilities for the authorized signatory.

The centralized repository may provide access. Access may be provided to one or more documents. The one or more documents may include signature documents. The documents may be associated with the authorized signatory.

The system may link the signatory. The signatory may be linked to one or more signature documents. The one or more signature documents may be associated with the authorized signatory.

The system may display information. The information may be displayed on a display. The information may include a map. The map may be a hierarchal map. The hierarchal map may be a map of the one or more authorized signatories.

The hierarchal map may illustrate authority. The map may illustrate lines of authority. The lines of authority may be from one or more authorized signatories. The lines of authority may culminate at the respective authorizer for the one or more authorized signatories.

The system may receive a request. The request may include a client request. The request may be a request to open an account. The account may be a client account.

The client request may be to edit an account and/or maintain an account in any suitable fashion. Such editing or maintenance may include inputting an address change into an account. Such editing may also include editing any other information, such as an informational paragraph, on the account. Such editing or maintenance may, in certain conditions, be submitted with the Straight Through Processing.

The client may be a pre-existing client. For example, the client may have a current account. In a further example, the client may wish to open a second account with the same institution.

The pre-existing client may be associated with one or more signatories. The signatories may be authorized signatories for a pre-existing account of the client. The authorized signatories may be stored on record for the client. The authorized signatories may be signatories for additional accounts associated with the client.

The system may determine if the signatory has been authorized previously as a signatory. The system may determine if the signatory has been previously authorized as the signatory for any account.

The system may determine if the authorized signatory for the requested account has been previously authorized. The system may determine if the authorized signatory has been authorized as a signatory. The system may determine if the authorized signatory has been authorized as a signatory for a second account.

The second account may be an already-existing or previously-existing account. The second account may be a pre-existing account of the client.

The hierarchal display may be configured to display. The hierarchal display may display one or more parties. The parties may be entitlement-granting parties. The display may be displayed for the authorized signatories.

The one or more entitlement-granting parties may be responsible for granting or awarding capabilities. The capabilities may include entitlement capabilities. The entitlement capabilities may be awarded to one or more authorized signatories.

The system may determine if the authorized signatory has been previously authorized. The system may determine if the authorized signatory has been previously authorized as a signatory for an account. The account may be a first account. The account may be a client account.

As stated above, the authorized signatory may have been previously authorized as a signatory for the client. With respect to such a circumstance, the system may transmit a request. The request may be a request to open an account. The account may be a client account. The account may be a second client account.

The system may determine if the requested client account satisfies one or more rules. The rules may include compliance rules. The compliance rules may include state or federal laws. The compliance rules may include regulatory rules. The compliance rules may include internal operating rules.

Based on a pre-determined algorithm, the system may open the requested second account. The algorithm may require that the requesting party is a signatory on a second account. The algorithm may require that the requested account will be in compliance with all the relevant regulations and/or statutes. In certain embodiments, if the algorithm determines that the requested account is requested by an individual who is already a signatory on an account and the requested account complies with all relevant regulations and statutes, the account may be opened using Straight Through Processing.

Straight Through Processing may include opening the account using an automated system. Straight Through Processing may include opening the account using automated processing. The account may be edited with Straight Through Processing. The account may be maintained with Straight Through Processing. The Straight Through Processing may not include human intervention. The Straight Through Processing may occur independent of human intervention.

With respect to the opening of the new account, the system may determine that the authorized signatory for the requested new client account has not been previously authorized as a signatory for a prior account. The system may determine that the authorized signatory has not been previously authorized as a signatory.

In such circumstances as the authorized signatory not being previously authorized as a signatory, the system may transmit the client request to open the account with the authorized signatory using standard authorization channels. Standard authorization channels may include human intervention and/or human assistance. Transmitting the client request to open the account via standard authorization channels may occur in response to the determination that the authorized signatory has not been previously authorized as a signatory.

The system may validate entitlement capabilities. The system may receive entitlement authorization. The authorization may be received for a signatory. The signatory may be an authorized signatory.

The system may store one or more capabilities. The capabilities may include entitlement capabilities. The entitlement capabilities may be stored in a centralized repository. The entitlement capabilities may include entitlement capabilities for the authorized signatory.

The centralized repository may provide access to one or more documents. The one or more documents may include signatory documents. The signature documents may be associated with the authorized signatory.

The system may link the signatory to one or more signature documents. The signature documents may be associated with the signatory's authorization.

The system may display a map. The map may be displayed on a display. The map may include a hierarchal map. The map may be a hierarchal map of the one or more authorized signatories.

The hierarchal map may illustrate lines of authority. The lines of authority may be illustrated from one or more authorized signatories. The lines of authority may be illustrated to each of their respective authorizers. In certain embodiments, the lines of authority may preferably include a vertical component.

The system may receive a request. The request may include a client request. The client request may include a request to open an account. As stated above, the request may also be to edit information on an account. The request may be to maintain an account.

The system may determine if the authorized signatory has previously been authorized as a signatory for an account. The account may be a first account. The account may be a client account.

The system may determine if the authorized signatory has not previously been authorized as a signatory for the client account. If the authorized signatory has not previously been authorized as a signatory for the client account, in certain embodiments, the system may determine if the requested account satisfies compliance rules.

In certain embodiments, if the requested account satisfies compliance rules, the system may open the requested second account. The requested second account may be opened using human intervention. The requested second account may be opened without human intervention. The requested second account may opened for the client. The client may be a pre-existing client.

The system may store pre-existing signatories. The pre-existing signatories may be associated with a client. The pre-existing signatories may include pre-existing authorized signatories. The signatories may be on record. The pre-existing authorized signatories may be associated with one or more additional accounts associated with the client.

The system may determine if the authorized signatory for the requested account has previously been authorized as a signatory for a second account associated with the client.

The system may display one or more entitlement-granting parties. The entitlement-granting parties may be displayed for the authorized signatories. The entitlement-granting party may be responsible for awarding entitlement capability. The entitlement capability may be awarded to one or more authorized signatories.

The system may determine if the authorized signatory has previously been authorized as a signatory for a first account. The account may be a client entity account. If the authorized signatory has been previously authorized as a signatory for the client entity, the system may transmit a request to open a second account for the client entity.

The system may determine that the authorized signatory for the requested account not previously been authorized as a signatory for an already-existing account. The system may transmit the client request to open the account. The request may be transmitted in response to the determination that the authorized signatory has not been previously authorized as a signatory for an already-existing account. The system may transmit the client request to open the account via standard authorization channels. The request may be a request to open the account with human intervention.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FDD, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
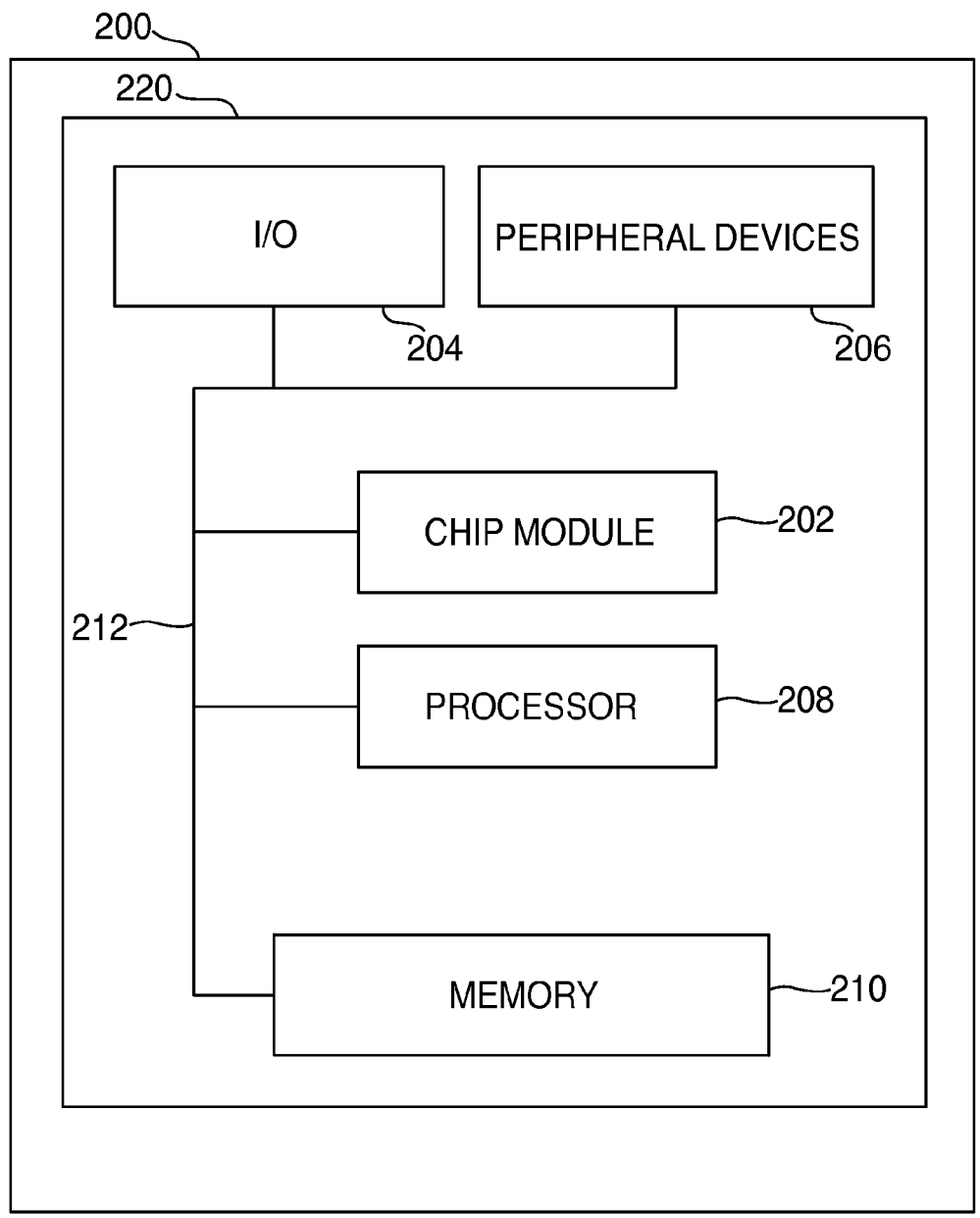
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data and/or determine signatory entitlement requirements and machine-readable memory 210.

Machine-readable memory 210 may be configured to store in machine-readable data structures: information pertaining to a signatory, information pertaining to an administrator of the repository and the signatories which he may oversee, the current time, information pertaining to historical entitlements, information relating to current regulations, rules and/or statutes relating to account compliance and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
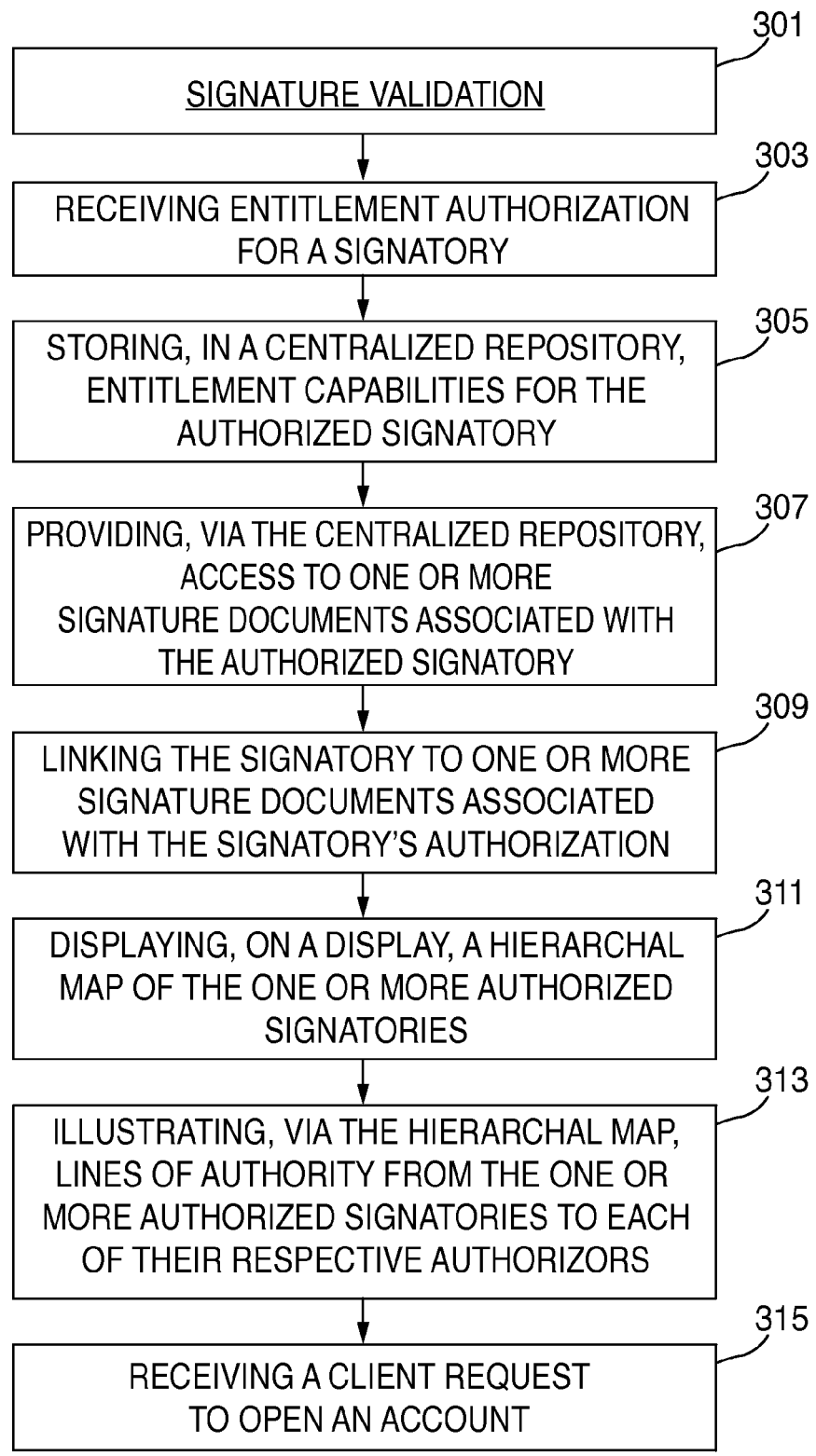
FIG. 3 shows an illustrative flow diagram according to certain embodiments.

FIG. 3 shows illustrative process 301 for signature validation.

Process 301 may begin at step 303. At step 303, the system may receive authorization. The authorization may include entitlement authorization. The authorization may include authorization for a signatory.

At step 305, the system may store capabilities. The capabilities may include entitlement capabilities. Entitlement capabilities may be stored in a centralized repository. The entitlement capabilities may be for the authorized signatory.

At step 307, the system may provide access. Access may be provided via the centralized repository. Access may include access to one or more signature documents. The signature documents may be associated with the authorized signatory.

At step 309, the system may link the signatory. The signatory may be linked to one or more signature documents. The one or more signature documents may be associated with the signatory's authorization.

At step 311, the system may display a map. The map may be a hierarchal map. The hierarchal map may be displayed on a display. The map may include a map of the one or more authorized signatories.

At step 313, the system may illustrate lines of authority. Lines of authority may be illustrated via the hierarchal map. The lines of authority may be illustrated from one or more authorized signatories. The lines of authority may be illustrated to an authorizer. The authorizer may be an authorizer for one or more authorized signatories.

At step 315, the system may receive a request. The request may include a client request. The client request may include a request to open an account. As stated above, the request may be to edit the information on an account or to maintain an account.

Figure 4:
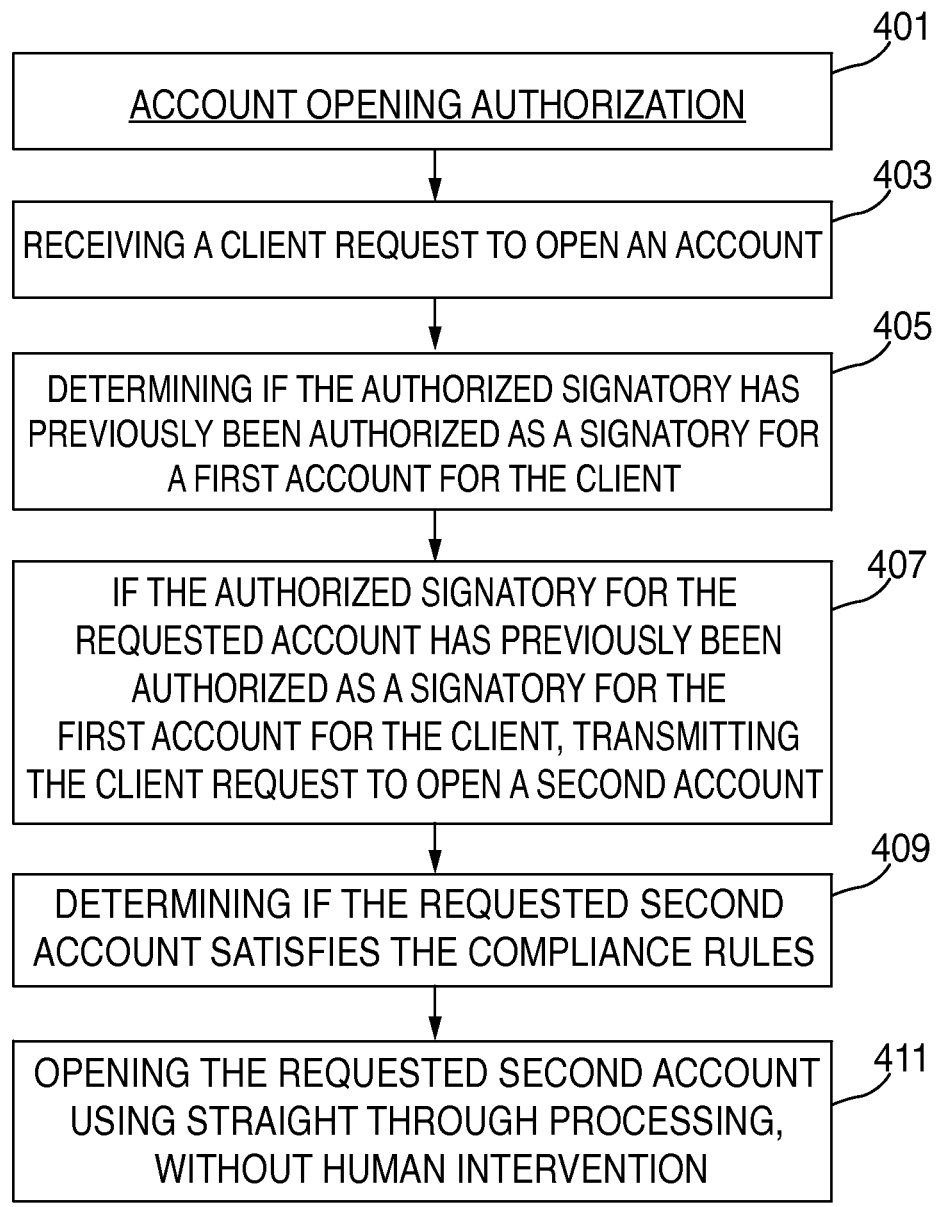
FIG. 4 shows another illustrative flow diagram in accordance with the principles of the invention.

FIG. 4 shows illustrative process 401 for account opening authorization.

Process 401 may begin at step 403. At step 403, the system may receive a request. The request may be a client request. The request may be a request to open an account. As stated above, the request may be to edit the information on an account or to maintain an account.

At step 405, the system may determine if a signatory is an authorized signatory. The system may determine if the authorized signatory has been previously authorized. The system may determine if the authorized signatory has been previously authorized as a signatory for an account. The account may be a first account. The account may be a client account.

At step 407, the system may determine if the authorized signatory for the requested account has previously been authorized as a signatory. The signatory may be a signatory for a first account. The first account may be a client account. If the authorized signatory has previously been authorized as a signatory, the system may transmit the request. The request may be a client request. The request may include a request to open a second account.

At step 409, the system may determine if the requested account satisfies one or more rules. The rules may be compliance rules.

In certain embodiments, if step 409 determines that the account satisfies one or more compliance rules, the system may, at step 411, open the requested second account. The account may be opened using straight through processing. The straight through processing may be without human intervention.

Figure 5:
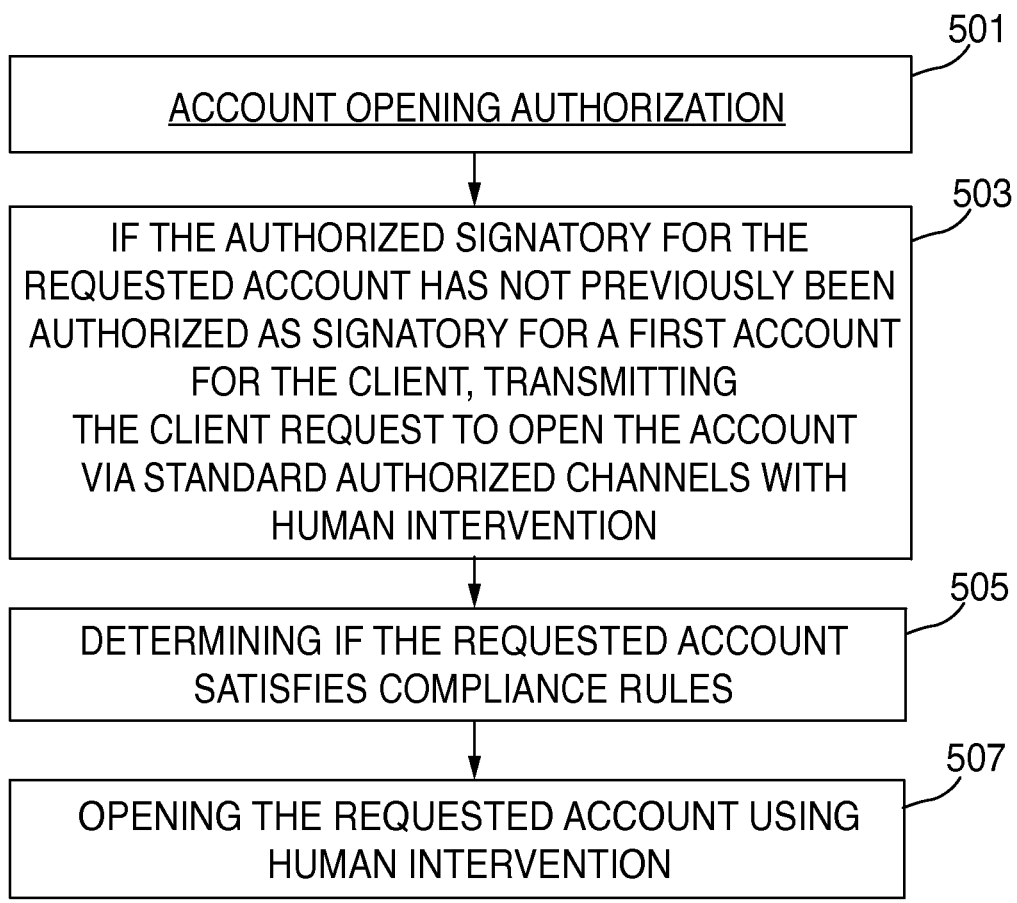
FIG. 5 shows yet another illustrative flow diagram in accordance with the principles of the invention.

FIG. 5 shows illustrative process 501 for account opening authorization.

Process 501 may begin at step 503. At step 503, the system may determine if the authorized signatory for a requested account has not previously been authorized as a signatory for a first account for a client. If the authorized signatory for the requested account has not previously been authorized as the signatory for the first account for the client, the system may transmit a request. The request may be a client request. The request may include a request to open the account via standard authorization channels. Standard authorization channels may include human intervention.

At step 505, the system may determine if the requested account satisfies compliance rules.

At step 507, the system may open the requested account using human intervention.

Thus, methods and apparatus for determining whether an account opening request meets threshold requirements for Straight Through Processing are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for validating entitlement capabilities, the method comprising:
   receiving from an authorizer, entitlement authorization for an authorized signatory, the entitlement authorization comprising:
      entitlement capabilities for the authorized signatory; and
      one or more authorizing signature documents;
   storing, in a centralized repository:
      the entitlement capabilities for the authorized signatory; and
      the one or more authorizing signature documents, wherein the centralized repository provides access to the authorizing signature documents;
   linking the authorized signatory to one or more of the authorizing signature documents;
   based on the one or more authorizing signature documents, generating a hierarchical map for one or more authorized signatories, wherein the hierarchical map illustrates lines of authority from the one or more authorized signatories to each of their respective authorizers, the hierarchical map comprising a vertical arrangement;
   displaying, on a display, the hierarchical map;
   receiving a client request to open an account;
   based in part on one or more of the authorizing signature documents, determining whether the client request to open an account is qualified for Straight Through Processing;
   determining that the authorized signatory has previously been authorized as a signatory for a first account for the client;
   transmitting a request to open a second account for the client in response to the determination that the authorized signatory has previously been authorized as a signatory for a first account of the client; and
   opening the requested second account using Straight Through Processing, wherein Straight Through Processing comprises opening the account without human intervention.

2. The method of claim 1 wherein the client is a pre-existing client.

3. The method of claim 1 wherein the account comprises a pre-existing authorized signatory on record for additional accounts associated with the client.

4. The method of claim 1 further comprising determining if the authorized signatory has been previously authorized as a signatory for any account associated with the client.

5. The method of claim 1 further comprising determining if the authorized signatory for the requested account has been previously authorized as a signatory for a second account.

6. The method of claim 5 wherein the second account is an already-existing account for the client.

7. The method of claim 1 wherein the hierarchical display further comprises displaying, for the authorized signatories, one or more entitlement-granting parties, wherein said one or more entitlement-granting parties are responsible for awarding entitlement capability to the one or more authorized signatories.

8. The method of claim 1 further comprising determining if the second account satisfies compliance rules.

9. The method of claim 1 wherein, when the authorized signatory for the second account has not been previously authorized as signatory for the first account, the method further comprises transmitting the client request to open the second account via standard authorization channels with human intervention.

10. An apparatus for validating entitlement capabilities, the apparatus comprising:
 a receiver configured to receive from an authorizer:
  entitlement authorization for a signatory, the entitlement authorization comprising:
   entitlement capabilities for the authorized signatory; and
   one or more authorizing signature documents; and
  a client request to open an account;
 memory configured to:
  store, in a centralized repository:
   the entitlement capabilities for the authorized signatory; and
   the one or more authorizing signature documents, wherein the centralized repository provides access to the authorizing signature documents; and
  link the authorized signatory to one or more of the authorizing signature documents;
 a logical processing device configured to:
  determine signatory requirements for the account by computing structural parameters of data associated with the client request;
  access one or more stored authorizing signature documents; and
  based in part on one or more of the authorizing signature documents, determine whether the client request to open an account is qualified for Straight Through Processing;
 a display configured to display a hierarchical map of the one or more authorized signatories, wherein the hierarchical map illustrates lines of authority from the one or more authorized signatories to each of their respective authorizers, the hierarchical map comprising a vertical arrangement;
 the logical processing device further configured to determine that the authorized signatory has previously been authorized as a signatory for a first account for the client; and
 a transmitter configured to transmit a request to open a second account for the client in response to the determination that the authorized signatory has previously been authorized as a signatory for a first account of the client;
 the logical processing device further configured to open the requested second account using Straight Through Processing, wherein Straight Through Processing comprises opening the account without human intervention.

11. The apparatus of claim 10 wherein the client is a pre-existing client.

12. The apparatus of claim 10 wherein the memory is further configured to store, for the client, pre-existing authorized signatories on record, said pre-existing authorized signatories being associated with one or more additional accounts associated with the client.

13. The apparatus of claim 10 wherein the display is further configured to display, for the authorized signatories, one or more entitlement-granting parties, wherein said one or more entitlement-granting parties are responsible for awarding entitlement capability to the one or more authorized signatories.

14. The apparatus of claim 10 wherein, when the authorized signatory for the second account has not been previously authorized as signatory for the first account, the transmitter is further configured to transmit the client request to open the account via standard authorization channels with human intervention.

* * * * *